(12) United States Patent
Mertesdorf

(10) Patent No.: US 6,865,331 B2
(45) Date of Patent: Mar. 8, 2005

(54) ROTATING RADIUS LIMITER FOR CABLE MANAGEMENT PANEL AND METHODS

(75) Inventor: Daniel R. Mertesdorf, Nicollet, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 10/346,914

(22) Filed: Jan. 15, 2003

(65) Prior Publication Data

US 2004/0136676 A1 Jul. 15, 2004

(51) Int. Cl.[7] .................................................. G02B 6/00
(52) U.S. Cl. ....................................................... 385/135
(58) Field of Search ................................. 385/134–135

(56) References Cited

U.S. PATENT DOCUMENTS

| | | |
|---|---|---|
| 2,864,656 A | 12/1958 | Yorinks |
| 4,373,776 A | 2/1983 | Purdy |
| 4,792,203 A | 12/1988 | Nelson et al. |
| 4,820,007 A | 4/1989 | Ross et al. |
| 4,840,449 A | 6/1989 | Ghandeharizadeh |
| 4,898,448 A | 2/1990 | Cooper |
| 4,995,688 A | 2/1991 | Anton et al. |
| 5,024,498 A | 6/1991 | Becker et al. |
| 5,066,149 A | 11/1991 | Wheeler et al. |
| 5,127,082 A | 6/1992 | Below et al. |
| 5,142,607 A | 8/1992 | Petrotta et al. |
| 5,209,572 A | 5/1993 | Jordan |
| 5,240,209 A | 8/1993 | Kutsch |
| 5,247,603 A | 9/1993 | Vidacovich et al. |
| 5,285,515 A | 2/1994 | Milanowski et al. |
| 5,323,480 A | 6/1994 | Mullaney et al. |
| 5,339,379 A | 8/1994 | Kutsch et al. |
| 5,363,466 A | 11/1994 | Milanowski et al. |
| 5,497,444 A | 3/1996 | Wheeler |
| 5,511,144 A | 4/1996 | Hawkins et al. |
| 5,640,481 A | 6/1997 | Llewellyn et al. |
| 5,724,469 A | 3/1998 | Orlando |
| 5,802,237 A | 9/1998 | Pulido |
| 5,811,055 A | 9/1998 | Geiger |
| 5,887,106 A | 3/1999 | Cheeseman et al. |
| 5,917,984 A | 6/1999 | Roseler et al. |
| 5,946,440 A | 8/1999 | Puetz |
| 6,009,224 A | 12/1999 | Allen |
| 6,044,194 A | 3/2000 | Meyerhoefer |
| 6,215,938 B1 | 4/2001 | Reitmeier et al. |
| 6,226,436 B1 | 5/2001 | Daoud et al. |
| 6,236,795 B1 | 5/2001 | Rodgers |
| 6,271,476 B1 | 8/2001 | Bobowick et al. |
| 6,278,830 B1 | 8/2001 | Levesque et al. |
| 6,307,999 B1 | 10/2001 | Daoud |
| 6,321,017 B1 | 11/2001 | Janus et al. |
| 6,351,591 B1 | 2/2002 | Daoud |
| 6,396,989 B1 | 5/2002 | Johnston et al. |
| 6,438,310 B1 | 8/2002 | Lance et al. |
| 6,504,988 B1 | 1/2003 | Trebesch et al. |
| 2002/0054747 A1 | 5/2002 | Foley |

FOREIGN PATENT DOCUMENTS

| | | |
|---|---|---|
| EP | 0 464 570 A1 | 1/1992 |
| FR | 2 678 076 A1 | 12/1992 |
| WO | WO 95/07480 | 3/1995 |
| WO | WO 96/10203 | 4/1996 |

Primary Examiner—Khiem Nguyen
(74) Attorney, Agent, or Firm—Merchant & Gould P.C.

(57) ABSTRACT

A rotating radius limiter for an optical fiber cable management panel is provided. The radius limiter includes a radius limiter structure and a bracket that permit relative motion between the structure and the bracket. The structure and bracket are mounted to a sliding cable management panel. The radius limiter structure includes a curved wall, an opening for receiving cables and a trough section for retaining cables about a radius portion.

23 Claims, 7 Drawing Sheets

ROTATING RADIUS LIMITER FOR CABLE MANAGEMENT PANEL AND METHODS

TECHNICAL FIELD

This disclosure concerns management of optical fiber cables. In particular, this disclosure relates to storage of optical fiber cables and devices in the telecommunications industry.

BACKGROUND

Cable termination, splice, and storage devices are known including, for example, devices shown in U.S. Pat. Nos. 4,792,203 and 5,946,440, both assigned to ADC Telecommunications, Inc. Both of these patents concern devices with movable trays for storage and management of the optical fiber cables. U.S. Pat. No. 5,066,149, also assigned to ADC Telecommunications, concerns a cable management device including slidable drawers, each including a cable slack take-up mechanism. When moving the trays or drawers, unnecessary or excessive displacement of the optical fiber cables is undesirable. As the optical fiber cables are displaced, they are subject to bending and other forces. Bending of the fibers can cause attenuation and loss of signal strength. As the fiber bends, the fiber can also break, resulting in a loss of transmission through the fiber. Improvements are desirable.

SUMMARY

In one aspect, this disclosure describes a radius limiter assembly for an optical fiber cable management panel. The radius limiter assembly includes a radius limiter and a bracket, associated with each other to permit pivotal motion of the radius limiter.

In one embodiment, the radius limiter includes a frame piece defining a trough section for holding cables, and a cable entry opening in communication with the trough section to permit cables to enter through the opening and rest within the trough section. Preferably, the bracket is secured to the radius limiter, in a manner that permits pivotal motion relative between the bracket and the radius limiter.

In another aspect, this disclosure concerns an optical fiber cable management panel including a drawer assembly and a cable radius limiter slidably mounted relative to the drawer assembly. The cable radius limiter is mounted to the drawer assembly in a manner that permits pivotal motion of the radius limiter relative to the drawer assembly.

In preferred embodiments, the drawer assembly includes a chassis and a drawer, with the drawer being slidably mounted within the chassis. Further, in preferred embodiments, there is a control mechanism secured to the drawer assembly to synchronize slidable movement of the cable radius limiter relative to the slidable movement of the drawer within the chassis. Preferably, the cable radius limiter is pivotally mounted to the control mechanism to permit pivoting of the radius limiter relative to the drawer assembly.

In another aspect, this disclosure concerns a method of limiting a radius of optical fiber cables. The method includes a step of providing an optical fiber cable management panel, including a chassis, a drawer and a radius limiter. There is also a step of directing optical fiber cables through a cable entry opening in the radius limiter and into a trough section of the radius limiter. After this step of directing, there is a step of pivoting the radius limiter relative to the drawer.

DETAILED DESCRIPTION

Figure 1:
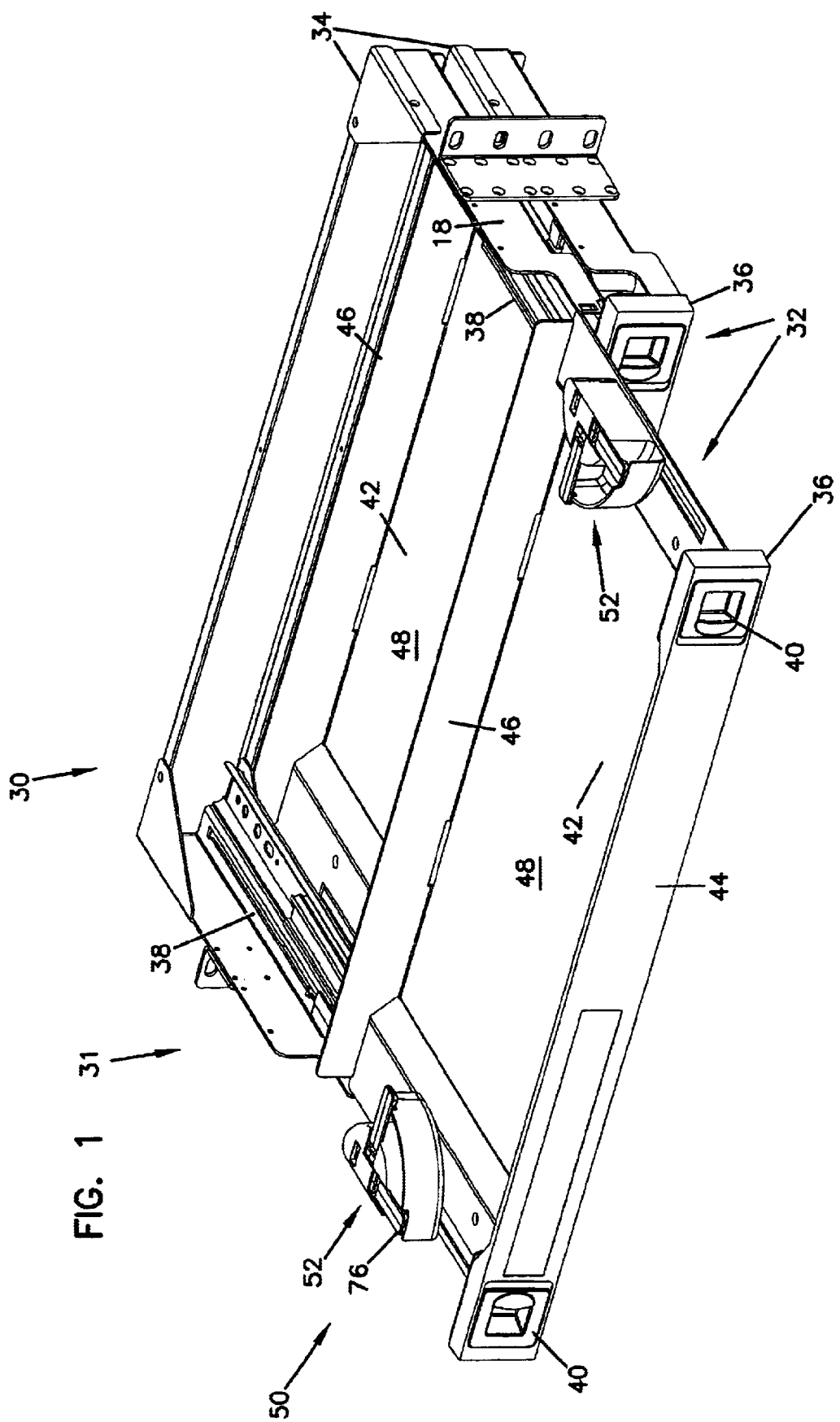
FIG. 1 is a perspective view of a cable management panel, depicting two drawers, one closed and one partially opened.
Figure 2:
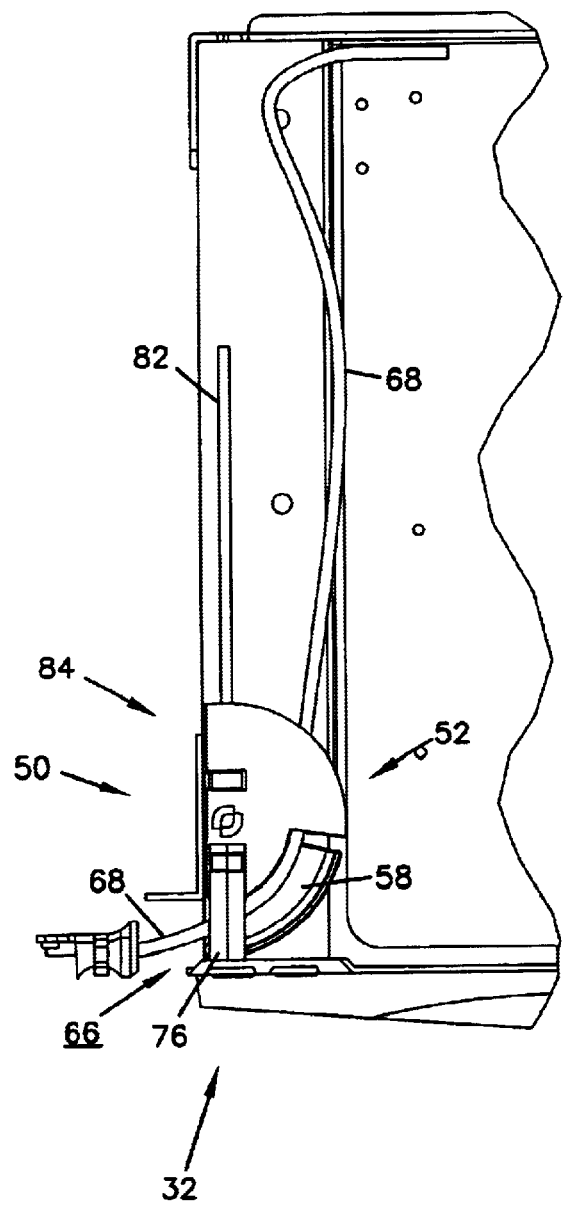
FIG. 2 is a top plan view of one of the drawer assemblies depicted in FIG. 1, and shown in a fully closed position.
Figure 3:
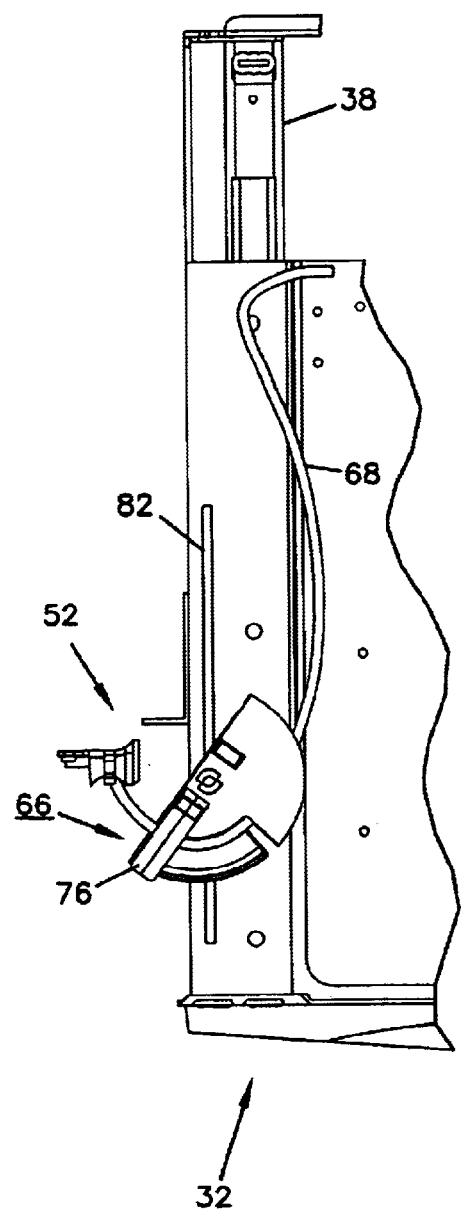
FIG. 3 is a top plan view of the drawer assembly depicted in FIG. 2, partially opened, and depicting a radius limiter pivoted from its position shown in FIG. 2.
Figure 4:
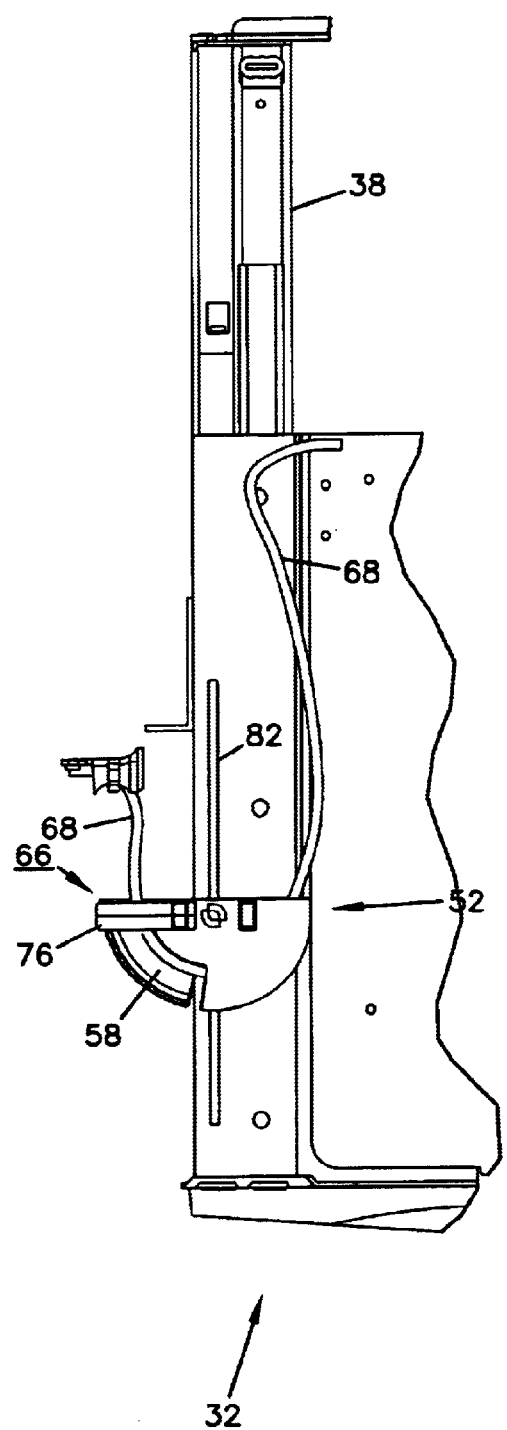
FIG. 4 is a top plan view of the drawer assembly depicted in FIGS. 2 and 3, and depicting the drawer assembly in a partially opened position and with the radius limiter pivoted 90 degrees relative to the position shown in FIG. 2.
Figure 5:
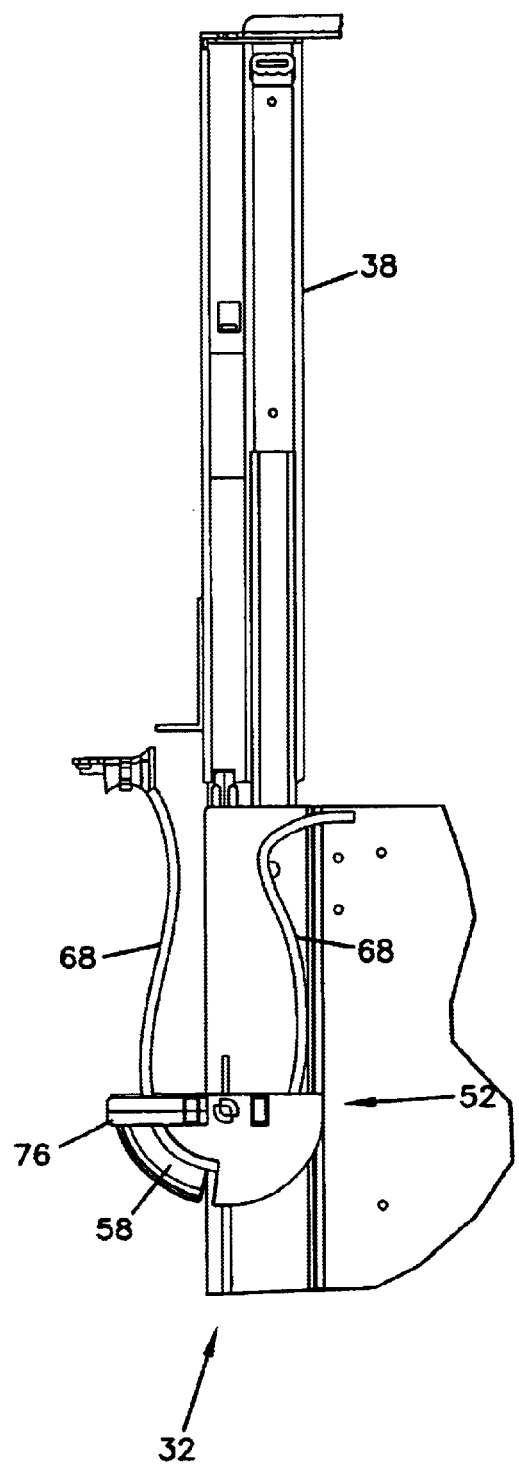
FIG. 5 is a top plan view of the drawer assembly depicted in FIGS. 2–4 and showing the drawer assembly in a fully opened position and with the radius limiter pivoted 90 degrees relative to its position shown in FIG. 2.

A cable management panel or module is depicted in FIG. 1 generally at 30. In the one shown, the panel 30 includes a plurality of drawer assemblies 32. In the one shown in FIG. 1, the panel 30 includes two drawer assemblies 32. Each of the drawer assemblies 32 includes a chassis 34 and a drawer 36 slidably mounted within the chassis 34.

Each drawer 36 may include cable management structure, for example, devices for storing the cables or connecting the cables to other cables or fiber optic devices, such as attenuators, couplers, switches, wave division multiplexers, splitters or splices. Drawers 36 are slidable relative to the chassis 34 by way of two drawer slides 38 on opposite sides of the chassis 34. In the particular embodiment shown, each drawer 36 includes two latches 40 to secure the drawer 36 in a closed position.

Each drawer 36 includes a base 42, a front wall 44, and a rear wall 46. Note that the drawer 36 is absent side walls, or is "side wall free." This structure allows for cable entry and exit and prevents cable damage during sliding movement of the drawers 36 when accessing the cables and connectors or other devices in the drawer 36. The base 42, front wall 44 and rear wall 46 together define a storage interior 48 for holding and storing the cables.

Each storage interior 48 is sized for receiving cable management and/or distribution structures. When the drawer 36 is in the closed position, the cables and management or distribution structures in the storage interior 48 are protected. In preferred embodiments, the distribution structures can be conveniently mounted on a tray insert that drops into the storage interior 48. This allows for convenient structuring of the drawer 36 to serve one or more desired functions in the panel 30. Examples of tray inserts are described in co-pending and commonly assigned U.S. patent application Ser. No. 09/649,398, which is a continuation-in-part of application Ser. No. 09/490,379 (also co-pending and commonly assigned), each of which is incorporated by reference herein. In the preferred embodiment, each of the drawers 36 is constructed to be stackable and linkable to form sub-cable management panels 31. Such modularity also allows for ease of use for a variety of different needs for the cable management system.

Preferably, each of the drawer assemblies 32 includes a take up mechanism 50 to manage optical fibers entering and exiting the cable management panel 30. In the preferred embodiment illustrated, each take up mechanism 50 includes a push member or radius limiter 52.

In general, the radius limiter 52 is arranged relative to the drawer assembly 32 to permit manipulation of cable through a wide range of angles. One manner this is accomplished is by arranging the radius limiter 52 relative to the drawer assembly 32 to allow the radius limiter 52 to rotate, swivel or pivot relative to the drawer assembly 32. Rotating, swiveling or pivoting motion of the radius limiter 52 allows cable to move through a wider range of angles than if the radius limiter 52 were not permitted to rotate, swivel or pivot. In general, attention is directed to FIGS. 2–5 that illustrate pivoting motion of the radius limiter 52 relative to the drawer assembly 32. This motion is discussed further below.

In reference now to FIGS. 15–18, one preferred embodiment of radius limiter 52 is illustrated and includes a frame piece 54. The frame piece 54 includes a vertically oriented curved wall 56 and a trough section 58 adjacent to the vertically curved wall 56. In particular, the trough section 58 is defined by a second vertically oriented wall 60 and a base 62 that bridges or joins the vertically oriented wall 60 and the curved wall 56. In the preferred embodiment, the curved wall 56 has a convexly shaped surface 86. As also can be seen in the preferred embodiment, the trough section 58 also has a curved shape corresponding to the convexly shaped surface 86 of the curved wall 56. In preferred embodiments, the curved shape of the trough section 58 is on a radius of about 1.25–2 inches.

The preferred frame piece 54 defines a cable entry opening 66 adjacent the curved wall 56 of the frame piece 54. The cable entry opening 66 is in communication with the trough section 58. As shown in FIGS. 2–5, the opening 66 permits cables 68 to enter through the opening 66 and rest within the trough section 58.

In reference again to FIGS. 2–5, the radius limiter 52 includes a finger 76. The finger 76 extends from the frame 54 and covers a portion of the trough section 58. In preferred embodiments, the finger 76 is selectively pivotable relative to the frame 54. Pivoting of the finger 76 away from remaining portions of the radius limiter 52 results in a gap or space between the finger 76 and the radius limiter 52. This gap or space facilitates loading of cable 68 into the trough 58 and the storage interior 48.

Figure 6:
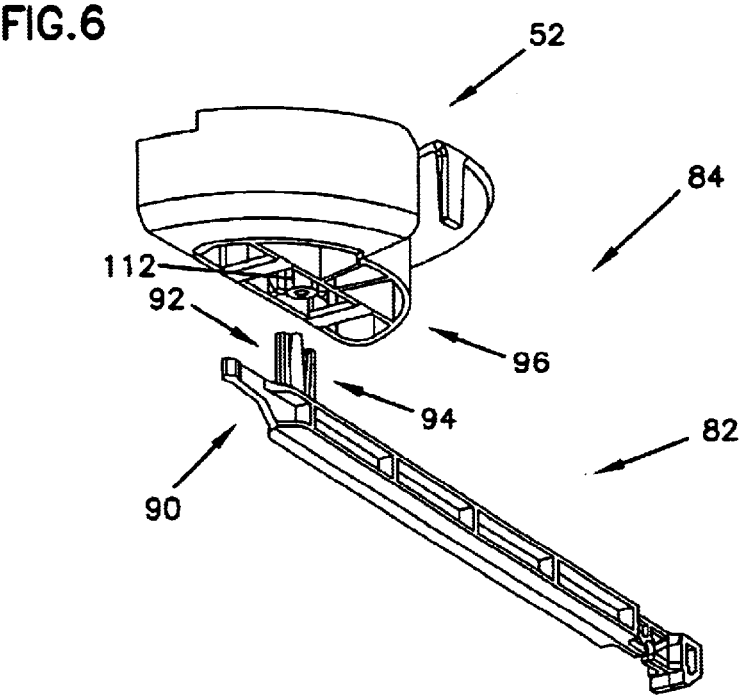
FIG. 6 is an exploded, perspective view of a radius limiter assembly, including a radius limiter and a bracket.
Figure 7:
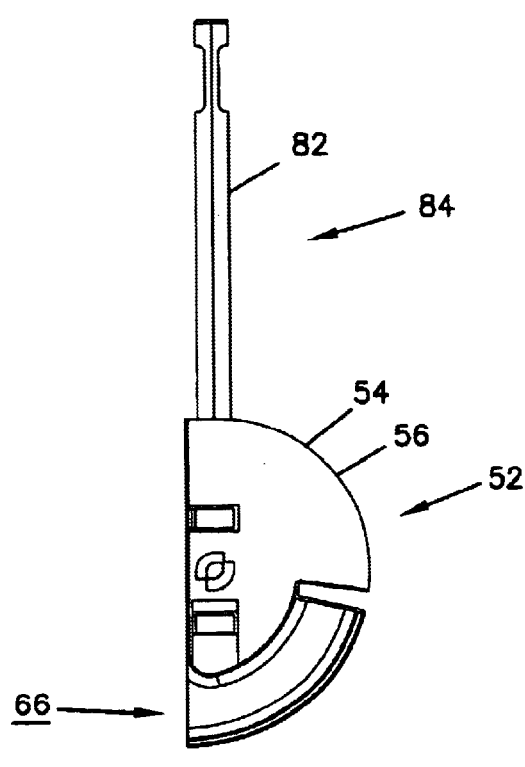
FIG. 7 is a top plan view of the radius limiter assembly depicted in FIG. 6 and in operable assembly.
Figure 8:
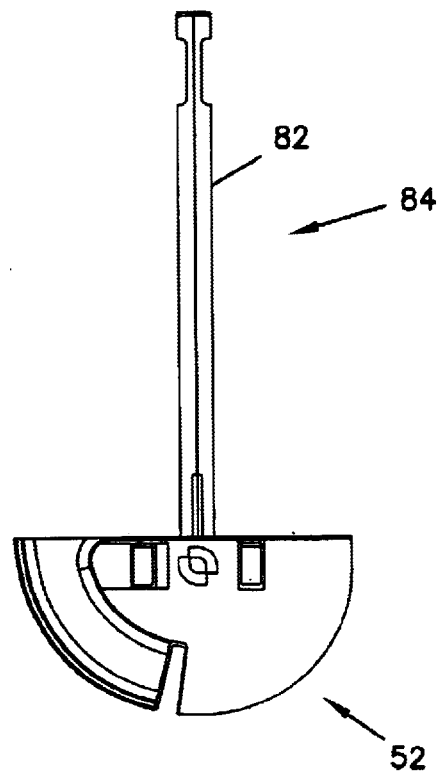
FIG. 8 is a top plan view of the radius limiter assembly depicted in FIGS. 6 and 7, and showing the radius limiter pivoted 90 degrees relative to its position in FIG. 7.

Referring now to FIGS. 6–8, the radius limiter 52 is part of a radius limiter assembly 84, which also includes a bracket 82. The bracket 82 is typically secured to the drawer assembly 32. The radius limiter 52 and the bracket 82 are associated with each other in a manner to permit swivel, pivot or rotation therebetween. In general, the connection between the radius limiter 52 and the bracket 82 allows rotation of the radius limiter 52 at least 10 degrees, no greater than 120 degrees, and typically 80–100 degrees relative to the bracket 82. In the embodiment shown in FIGS. 5 and 8, the radius limiter 52 is rotated 90 degrees relative to the bracket 82.

One preferred pivot connection is shown at 90 in FIG. 6. While a variety of embodiments are possible and contemplated herein, in the particular embodiment illustrate, the pivot connection 90 includes a projection and track arrangement 92. The projection and track arrangement 92 includes projection structure 94 extending from either the frame 54 of the radius limiter 52 and the bracket 82. The track arrangement includes track structure 96 on the other one of the frame 54 and bracket 82. As such, it can be appreciated that one piece of the radius limiter assembly 84 includes projection structure 94, while the other piece of the radius limiter assembly 84 includes the track structure 96. These parts may be reversed.

Figure 11:
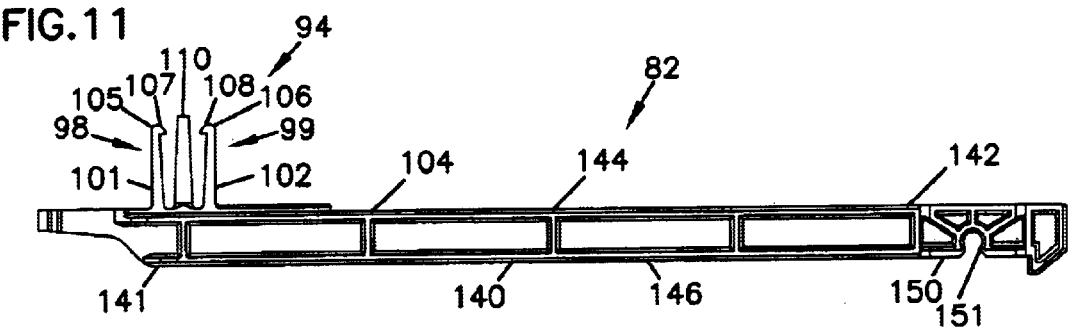
FIG. 11 is a side elevational view of the bracket utilized in the radius limiter assembly of FIGS. 6–8.
Figure 12:
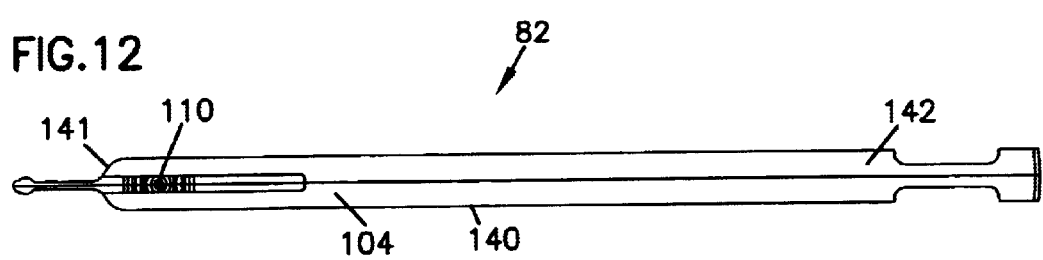
FIG. 12 is a top plan view of the bracket depicted in FIG. 11.
Figure 13:
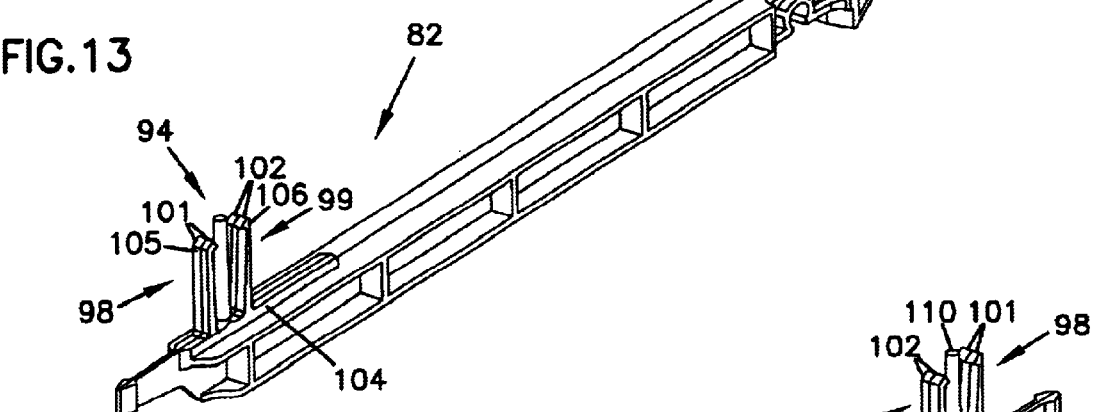
FIG. 13 is a front perspective view of the bracket depicted in FIG. 12.
Figure 14:
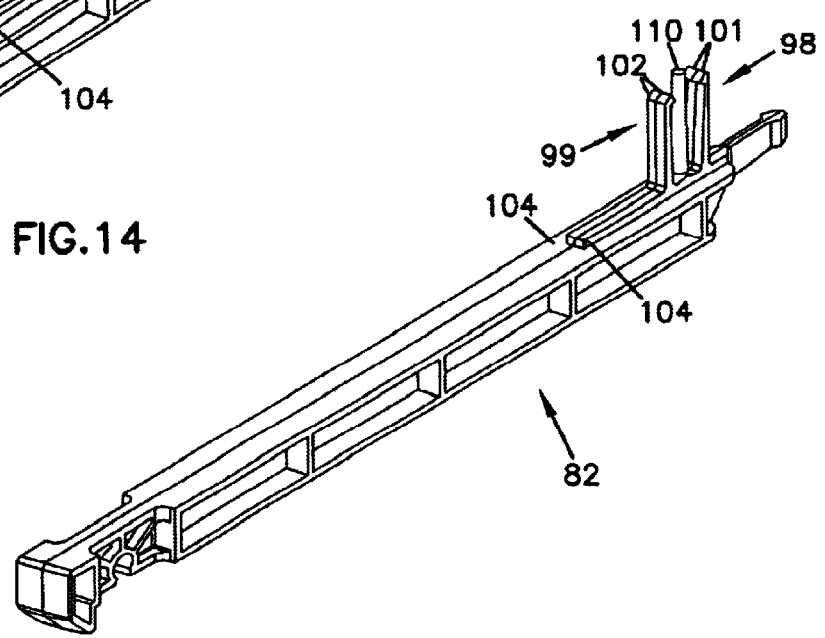
FIG. 14 is a rear perspective view of the bracket depicted in FIG. 13.
Figure 15:
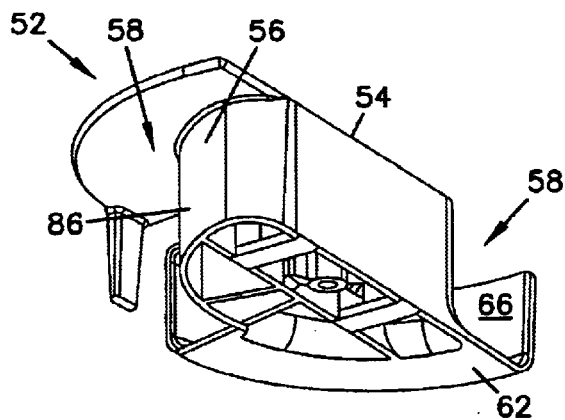
FIG. 15 is a bottom, first-side perspective view of the radius limiter depicted in FIG. 9.
Figure 16:
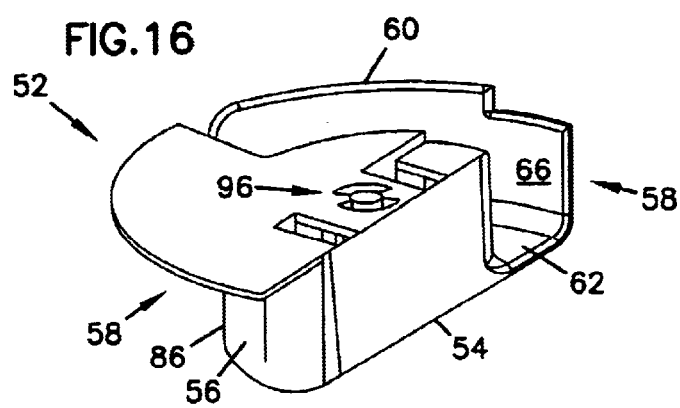
FIG. 16 is a top, first-side perspective view of the radius limiter depicted in FIG. 15.
Figure 17:
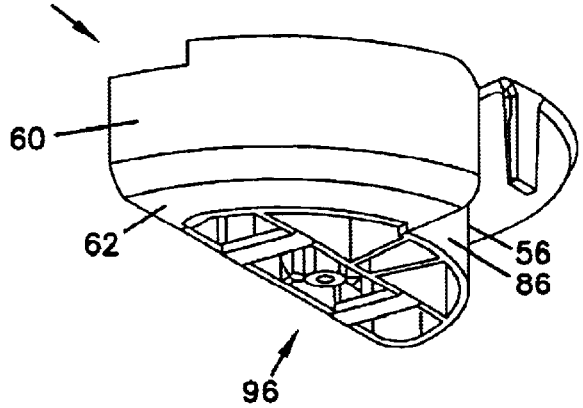
FIG. 17 is a bottom, second-side perspective view of the radius limiter depicted in FIG. 16.
Figure 18:
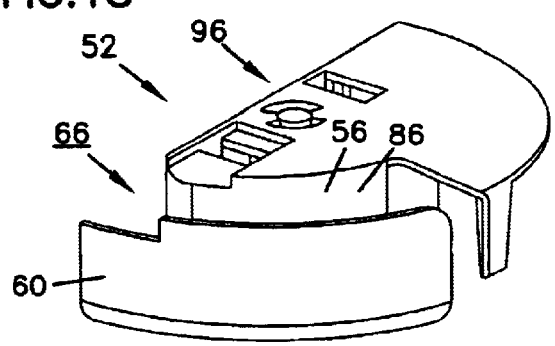
FIG. 18 is a top, second-side perspective view of the radius limiter depicted in FIG. 17.

In the particular embodiment illustrated in FIGS. 11–14, the projection structure 94 includes at least first and second flanges 98, 99 extending from remaining portions of the bracket 82 (see FIG. 11). Each of the first and second flanges 98, 99 includes an extension 101, 102 projecting from a base surface 104 of the bracket 82. Each of the extensions 101, 102 generally extend at an angle between 85–95 degrees relative to the base surface 104. As best shown in FIG. 11, each of the extensions 101, 102 also includes a free end 105, 106 terminating with a hook 107, 108. In the particular preferred embodiment illustrated, the projection structure 94 also includes a pin 110 extending from the base surface 104 between the first and second flanges 98, 99. Preferably, the pin 110 has a height that is greater than the height of each of the flanges 98, 99.

Figure 9:
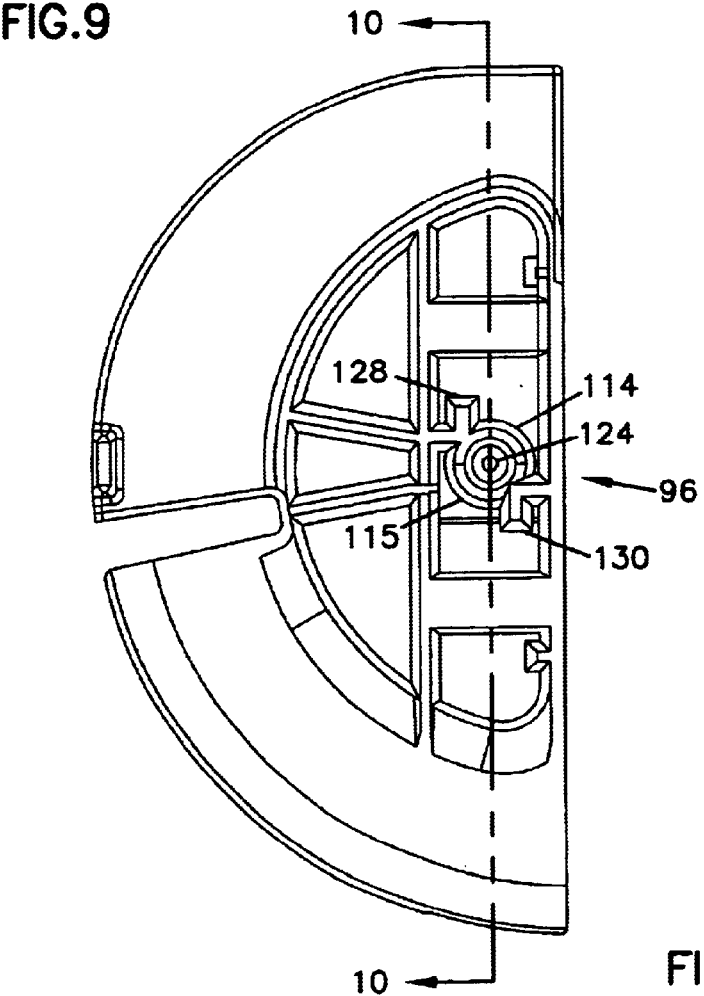
FIG. 9 is a bottom plan view of the radius limiter depicted in FIGS. 6–8.
Figure 10:
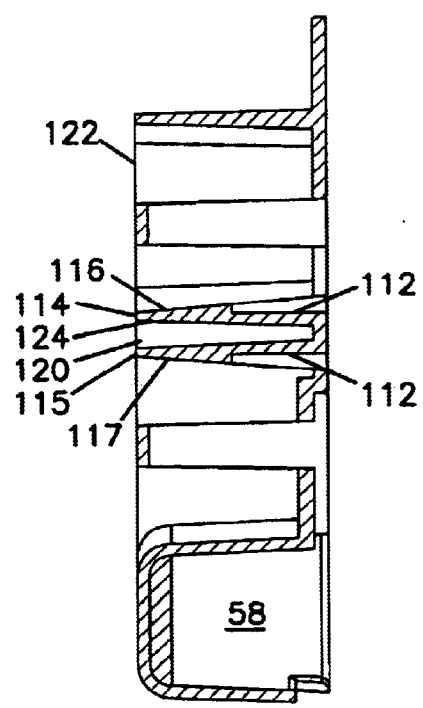
FIG. 10 is a cross-sectional view of the radius limiter depicted in FIG. 9 taken along line 10—10.

Also in the particular illustrated embodiment, shown best in FIGS. 9 and 10, the track structure 96 defines a slide surface 112 for slidable engagement with each of the hooks 107, 108 of the first and second flanges 98, 99. The slide surface 112 is defined by a portion of the frame piece 54, including a pair of extensions 114, 115 having an arched configuration and in opposing relation to each other. Each of the extensions 114, 115 has a ramp 116, 117 that gradually increases in thickness from an opening 120 defined by the frame 54 in its bottom face 122. Each of the ramps 116, 117 ends at the slide surface 112, such that the ramp extends between the opening 120 and the slide surface 112. The ramps 116, 117 allow for sliding the hooks 107, 108 into engagement with the slide surface 112.

As explained above, the extensions 114, 115 are preferably arched and opposing each other. As such, the extensions 114, 115 define an open volume or groove 124 therebetween. Preferably, the groove 124 is sized to receive the pin 110. As can be seen in FIG. 9, the groove 124 is centered within the track structure 96.

Still referring to FIG. 9, the preferred frame 54 includes at least one stop member 128 constructed and arranged to limit a range of pivotal motion of the radius limiter 52 relative to the bracket 82. In the particular embodiment illustrated, the frame 54 includes a second stop member 130. The stop member 128 is generally 180 degrees relative to the stop member 130. Due to this geometry, it can be appreciated that the radius limiter 52 is precluded or stopped from rotating more than 90 degrees relative to the bracket 82, due to the selection and location of the stop members 128, 130. In other embodiments, the stop members 128, 130 may be located at other positions and angled differently to permit greater or less rotation.

From a review of FIG. 6, assembly of the radius limiter assembly 84 can be appreciated. The projection structure 94 is snapped into the track structure 96. This is done by camming the first and second flanges 98, 99 along and against the ramps 116, 117 of the extensions 114, 115 (shown in FIG. 9). This camming action will flex the first and second flanges 98, 99 until the hooks 107, 108 reach the slide surface 112, and the flanges 98, 99 snap into engagement with the track structure 96. At the same time, the pin 110 is received within the groove 124. The radius limiter 52 is allowed to pivot relative to the bracket 82, as the hooks 107, 108 slide along the slide surface 112. The range of pivoting is limited by engagement of the hooks 107, 108 against the stops 130, 128. In particular, the hook 107 is arranged to engage stop 130, while the hook 108 is arranged to engage the stop 128.

Attention is again directed to FIG. 11. The particular preferred bracket 82 is illustrated in side elevational view. The bracket 82 includes a longitudinal extension 140 between first and second opposite ends 141, 142. In the orientation shown in FIG. 11, the base surface 104 forms a top portion 144 of the bracket 82. The projection structure 94 is preferably located adjacent to the first end 141 and extending from the base surface 104.

The longitudinal extension 140 also includes a bottom portion 146 located opposite of the top portion 144. Adjacent to the second end 142 is a wheel mount arrangement 150. In the one shown, the wheel mount arrangement 150 defines a curved opening 151 in the bottom portion 146. The curved opening 151 is sized to receive an axle of a wheel (not shown). The wheel is generally part of a control mechanism (also not shown) that is secured to the drawer assembly 32 to synchronize slidable movement of the radius limiter 52 relative to slidable movement of the drawer 36 within the chassis 34.

The radius limiter 52 is preferably slidably mounted relative to the drawer 36. Movement of the radius limiter 52 is controlled with a synchronized movement with the drawer 36 to ensure that the cables 68 do not bend too sharply when the drawer 36 is being opened or closed relative to the chassis 34. If the cables 68 were bent too sharply, this may cause loss of signal strength or loss of transmission.

The radius limiter 52 is preferably used with an optical fiber cable management panel 30 having a chassis 34 with slideable drawer assemblies 32 mounted therein. A user generally directs the fiber optic cables through the cable entry opening 66 and into the trough section 53 of the radius limiter 52. In use, the operator may slide the drawer 36 relative to the chassis and then pivot the radius limiter 52 relative to the drawer 36 to accommodate the orientation of the drawer relative to the chassis and thereby manage the bend radius of the cables. In the alternative, the operator may slide the drawer and pivot the radius limiter simultaneously. The radius limiter 52 may be pivoted to any angle desired within a range limited by the stops 128 and 130. In one method, the radius limiter is pivoted at least 10 degrees relative to the drawer 36. In another method, the radius limiter is pivoted about 90 degrees relative to the drawer 36. As can be understood, the bracket 82 is mounted to the drawer 36 of the drawer assembly 32 and thus the radius limiter 52 pivots relative to the bracket 82 also.

The above specification, examples and data provide a complete description of principles of the invention and example embodiments. Many embodiments of the invention can be made according to these principles.

I claim:

1. A radius limiter assembly for an optical fiber cable management panel; the radius limiter assembly comprising:
   (a) a radius limiter; said radius limiter including a frame piece having a vertically oriented curved wall;
      (i) said curved wall including a convexly shaped surface;
      (ii) said frame piece defining a cable entry opening adjacent said curved wall within which cables enter said frame piece of said radius limiter; and
   (b) a bracket secured to said radius limiter;
      (i) said radius limiter being pivotally mounted to said bracket.

2. A radius limiter assembly according to claim 1 wherein:
   (a) said radius limiter is pivotally mounted to said bracket at a pivot connection between said radius limiter and said bracket;
      (i) said pivot connection being constructed and arranged to permit rotation of said radius limiter at least 45 degrees relative to said bracket.

3. A radius limiter assembly according to claim 2 wherein:
   (a) said pivot connection is constructed and arranged to permit rotation of said radius limiter no greater than 120 degrees relative to said bracket.

4. A radius limiter assembly according to claim 1 wherein:
   (a) said radius limiter is pivotally mounted to said bracket at a pivot connection between said radius limiter and said bracket;
      (i) said pivot connection being constructed and arranged to permit rotation of said radius limiter between 80–100 degrees relative to said bracket.

5. A radius limiter assembly according to claim 1 wherein:
   (a) said radius limiter is pivotally mounted to said bracket at a pivot connection between said radius limiter and said bracket;
      (i) said pivot connection comprising a projection and track arrangement; said projection and track arrangement including projection structure extending from one of said frame and said bracket, and said track arrangement including track structure on the other of said frame and said bracket.

6. A radius limiter assembly according to claim 5 wherein:
   (a) said projection structure includes at least first and second flanges extending from said bracket; each of said first and second flanges having a free end terminating with a hook; and
   (b) said track structure having a slide surface defined by said frame for slidable engagement with each of said first and second flange hooks.

7. A radius limiter assembly according to claim 6 wherein:
   (a) said projection structure further includes a pin extending from said bracket between said first and second flanges; and
   (b) said frame defines a groove sized to receive said pin; said groove being centered within said track structure.

8. A radius limiter assembly according to claim 1, wherein:
   (a) said frame piece further includes a trough section adjacent to said curved wall, the trough section having a curved shape corresponding to said convexly shaped surface of said curved wall.

9. A radius limiter assembly according to claim 8, wherein:
   (a) said cable entry opening is in communication with said trough section to permit cables to enter through said opening and rest within said trough section.

10. A radius limiter assembly according to claim 1 wherein:
    (a) said frame includes at least one stop member to limit a range of pivotal motion of said radius limiter relative to said bracket.

11. A radius limiter assembly according to claim 10 wherein:
    (a) said frame further includes at least two stop members to limit pivotal motion of said radius limiter relative to said bracket to pivot no greater than 100 degrees.

12. An optical fiber cable management panel comprising:
    (a) a drawer assembly including a chassis and a drawer;
       (i) said drawer being slidably mounted within said chassis;
       (ii) said drawer assembly defining a storage interior and a first cable access entry to permit optical fiber cable to enter into said storage interior;
    (b) a cable radius limiter slidably mounted relative to said drawer assembly; and
    (c) a control mechanism secured to said drawer assembly to synchronize slidable movement of said cable radius limiter relative to slidable movement of said drawer within said chassis;
       (i) said cable radius limiter being pivotally mounted to said control mechanism to permit pivoting of said radius limiter relative to said drawer assembly.

13. An optical fiber cable management panel according to claim 12 wherein:
    (a) said radius limiter is pivotally mounted to said control mechanism at a pivot connection;
       (i) said pivot connection being constructed and arranged to permit rotation of said radius limiter at least 45 degrees relative to said drawer assembly.

14. An optical fiber cable management panel according to claim 13 wherein:
    (a) said control mechanism includes a bracket; said pivot connection being between said bracket and said radius limiter.

15. An optical fiber cable management panel according to claim 14 wherein:
    (a) said pivot connection comprises a projection and track arrangement; said projection and track arrangement including projection structure extending from one of said radius limiter and said bracket, and said track arrangement including track structure on the other of said radius limiter and said bracket.

16. An optical fiber cable management panel according to claim 15 wherein:
    (a) said projection structure includes at least first and second flanges extending from said bracket; each of said first and second flanges having a free end terminating with a hook; and
    (b) said track structure having a slide surface defined by said radius limiter for slidable engagement with each of said first and second flange hooks.

17. An optical fiber cable management panel according to claim 15 wherein:
    (a) said control mechanism includes a rotating member oriented to rotate between said drawer and said chassis;
       (i) said rotating member being mounted on said bracket;
    (b) said drawer includes a base defining an elongated slot;
       (i) said bracket being secured to said cable radius limiter at said pivot connection through said elongated slot.

18. A method of limiting a radius of optical fiber cables; the method comprising:
    (a) providing an optical fiber cable management panel including a chassis, a drawer, and a radius limiter;
       (i) the drawer being slidably mounted within the chassis;
       (ii) the radius limiter including a frame piece defining a curved trough section and a cable entry opening in communication with the trough section;
    (b) directing optical fiber cables through the cable entry opening and through the trough section; and
    (c) after said step of directing, pivoting the radius limiter relative to the drawer.

19. A method according to claim 18 further including:
    (a) after said step of directing, sliding the drawer relative to the chassis.

20. A method according to claim 19 wherein:
    (a) said step of pivoting and said step of sliding are done simultaneously.

21. A method according to claim 18 wherein:
    (a) said step of pivoting includes pivoting the radius limiter relative to the drawer at an angle of at least 10 degrees.

22. A method according to claim 18 wherein:
    (a) said step of pivoting includes pivoting the radius limiter relative to the drawer at an angle of about 90 degrees.

23. A method according to claim 19 wherein:
    (a) said step of pivoting includes moving the radius limiter relative to a bracket secured to the drawer.

* * * * *